United States Patent
Tang

(10) Patent No.: US 11,312,030 B2
(45) Date of Patent: *Apr. 26, 2022

(54) SELF-DRIVING VEHICLE SYSTEM WITH STEERABLE CAMERA AND INDICATOR

(71) Applicant: LINGDONG TECHNOLOGY (BEIJING) CO. LTD, Beijing (CN)

(72) Inventor: Jie Tang, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 800 days.

This patent is subject to a terminal disclaimer.

(21) Appl. No.: 16/096,481

(22) PCT Filed: Oct. 15, 2018

(86) PCT No.: PCT/CN2018/110184
§ 371 (c)(1),
(2) Date: Oct. 25, 2018

(87) PCT Pub. No.: WO2020/077481
PCT Pub. Date: Apr. 23, 2020

(65) Prior Publication Data
US 2020/0338763 A1  Oct. 29, 2020

(51) Int. Cl.
*G05B 15/00* (2006.01)
*G05B 19/00* (2006.01)
(Continued)

(52) U.S. Cl.
CPC .......... *B25J 19/023* (2013.01); *B25J 19/022* (2013.01); *B66F 9/0755* (2013.01);
(Continued)

(58) Field of Classification Search
CPC ... B25J 19/022; B25J 19/023; G06K 9/00362; G06K 9/00664; G06K 9/00805;
(Continued)

(56) References Cited

U.S. PATENT DOCUMENTS 5,219,264 A   6/1993  McClure et al.
8,909,368 B2  12/2014 D'Andrea et al.
(Continued)

FOREIGN PATENT DOCUMENTS

CN   104085313 A   10/2014
CN   205028304 U    2/2016
(Continued)

OTHER PUBLICATIONS

This Robot Uses Machine Learning to Take Care of Absent-Minded Humans By Evan Ackerman May 20, 2016 (Year: 2016).*
(Continued)

*Primary Examiner* — Harry Y Oh
(74) *Attorney, Agent, or Firm* — NZ Carr Law Office PLLC

(57) ABSTRACT

Embodiments of the present disclosure include automated guided vehicles (AGVs) having a steerable camera for target-tracking. In one embodiment, the AGV includes a body having one or more motorized wheels, the body having a first end and a second end opposing the first end, a console coupled in an upright position to the first end of the body, and a first camera coupled to the console, the first camera providing one or more axes of rotation and is operable to follow an object.

11 Claims, 10 Drawing Sheets

(51) Int. Cl.
  *B25J 19/02* (2006.01)
  *B66F 9/075* (2006.01)
  *G06V 20/10* (2022.01)
  *G06V 20/58* (2022.01)
  *G06V 40/10* (2022.01)

(52) U.S. Cl.
  CPC .......... *B66F 9/07581* (2013.01); *G06V 20/10* (2022.01); *G06V 20/58* (2022.01); *G06V 40/10* (2022.01)

(58) Field of Classification Search
  CPC ............. B65G 2207/40; G05D 1/0246; G05D 2201/0216; B66F 9/0755; B66F 9/07581; B66F 9/063
  See application file for complete search history.

(56) References Cited

U.S. PATENT DOCUMENTS

| | | | | |
|---|---|---|---|---|
| 9,157,199 | B1* | 10/2015 | Kanerva | E01C 23/06 |
| 9,874,308 | B2 | 1/2018 | Saika et al. | |
| 2002/0135677 | A1* | 9/2002 | Noro | H04N 7/181 |
| | | | | 348/143 |
| 2005/0187819 | A1* | 8/2005 | Johnson | G06Q 30/0268 |
| | | | | 705/14.42 |
| 2011/0172850 | A1* | 7/2011 | Paz-Meidan | G05D 1/0033 |
| | | | | 701/2 |
| 2012/0212623 | A1* | 8/2012 | Cho | G05D 1/0246 |
| | | | | 348/169 |
| 2014/0142757 | A1* | 5/2014 | Ziegler | G06N 3/008 |
| | | | | 700/255 |
| 2015/0229906 | A1* | 8/2015 | Inacio De Matos | G01S 3/7864 |
| | | | | 348/46 |
| 2016/0327383 | A1* | 11/2016 | Becker | G01B 11/005 |
| 2017/0197315 | A1* | 7/2017 | Haegermarck | B25J 9/1692 |
| 2017/0302852 | A1* | 10/2017 | Lam | H04N 5/23287 |
| 2019/0063899 | A1* | 2/2019 | Barba | G01B 5/008 |
| 2019/0287063 | A1* | 9/2019 | Skaaksrud | B25J 9/1679 |
| 2020/0064827 | A1* | 2/2020 | Miller | G06F 3/017 |
| 2020/0109937 | A1* | 4/2020 | Zweigle | B25J 5/007 |

FOREIGN PATENT DOCUMENTS

| | | | |
|---|---|---|---|
| CN | 105607635 | A | 5/2016 |
| CN | 106125738 | A | 11/2016 |
| CN | 206039295 | U | 3/2017 |
| CN | 106774326 | A | 5/2017 |
| CN | 107577232 | A | 1/2018 |
| CN | 107807652 | A | 3/2018 |
| CN | 207318965 | U | 5/2018 |
| CN | 207676376 | U | 7/2018 |
| JP | 2019529277 | A * | 7/2017 |
| KR | 20120060064 | A | 6/2012 |

OTHER PUBLICATIONS

Search report of corresponding CN Application No. 2018800003625.X dated Aug. 3, 2021.

PCT International Search Report/Written Opinion dated Jan. 16, 2019 for Application No. PCT/CN2018/110184.

* cited by examiner

SELF-DRIVING VEHICLE SYSTEM WITH STEERABLE CAMERA AND INDICATOR

BACKGROUND

Field

Embodiments disclosed herein relate to improved self-driving vehicle systems with a steerable camera.

Description of the Related Art

Automatic Guided Vehicles (AGVs) are driverless, programmable controlled vehicles that can transport articles or inventory items from designated pickup area(s) to unloading area(s) within a facility. AGVs provide a safer environment for workers, inventory items, and equipment with precise and controlled movement. Some develops have incorporated electronics to the AGVs for target tracking. However, current AGV designs follow the operator from behind and are often out of the sight of the operator due to unexpected obstacle(s) along the route of traveling. Therefore, there exists a need for new and improved AGVs for effective target tracking.

SUMMARY

Embodiments of the present disclosure include automated guided vehicles (AGVs) having a steerable camera for target-tracking. In one embodiment, the AGV includes a body having one or more motorized wheels, the body having a first end and a second end opposing the first end, a console coupled in an upright configuration to the first end of the body, and a first camera coupled to the console, the first camera providing one or more axes of rotation and is operable to follow an object.

In another embodiment, a self-driving system is provided. The self-driving system includes a body having one or more motorized wheels, and a camera coupled to the body, wherein the camera has a beam pointer operable to produce a laser beam.

In yet another embodiment, a method for operating a self-driving system is provided. The method includes moving the self-driving system to a pre-determined area having a shelf, directing a camera to identify an object to be removed from the shelf based on a task instruction, and emitting a beam from the camera to the identified object.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure relate to automated guided vehicles (AGVs) having a steerable camera for target-tracking. The steerable camera has the ability to optically zoom in and out to identify/read the markers attached to an inventory or a shelf. The steerable camera includes a beam pointer that can produce a laser beam to help worker(s) locate the inventory to be loaded or unloaded from the shelf. While the term AGV is used, the concept of this disclosure can be applied to any self-driving systems or mobile robots, such as autonomously-navigating mobile robots, inertially-guided robots, remote-controlled mobile robots, and robots guided by laser targeting, vision systems, or roadmaps. Various embodiments are discussed in greater detail below with respect to FIGS. 1-10.

Figures 1A, 1B:
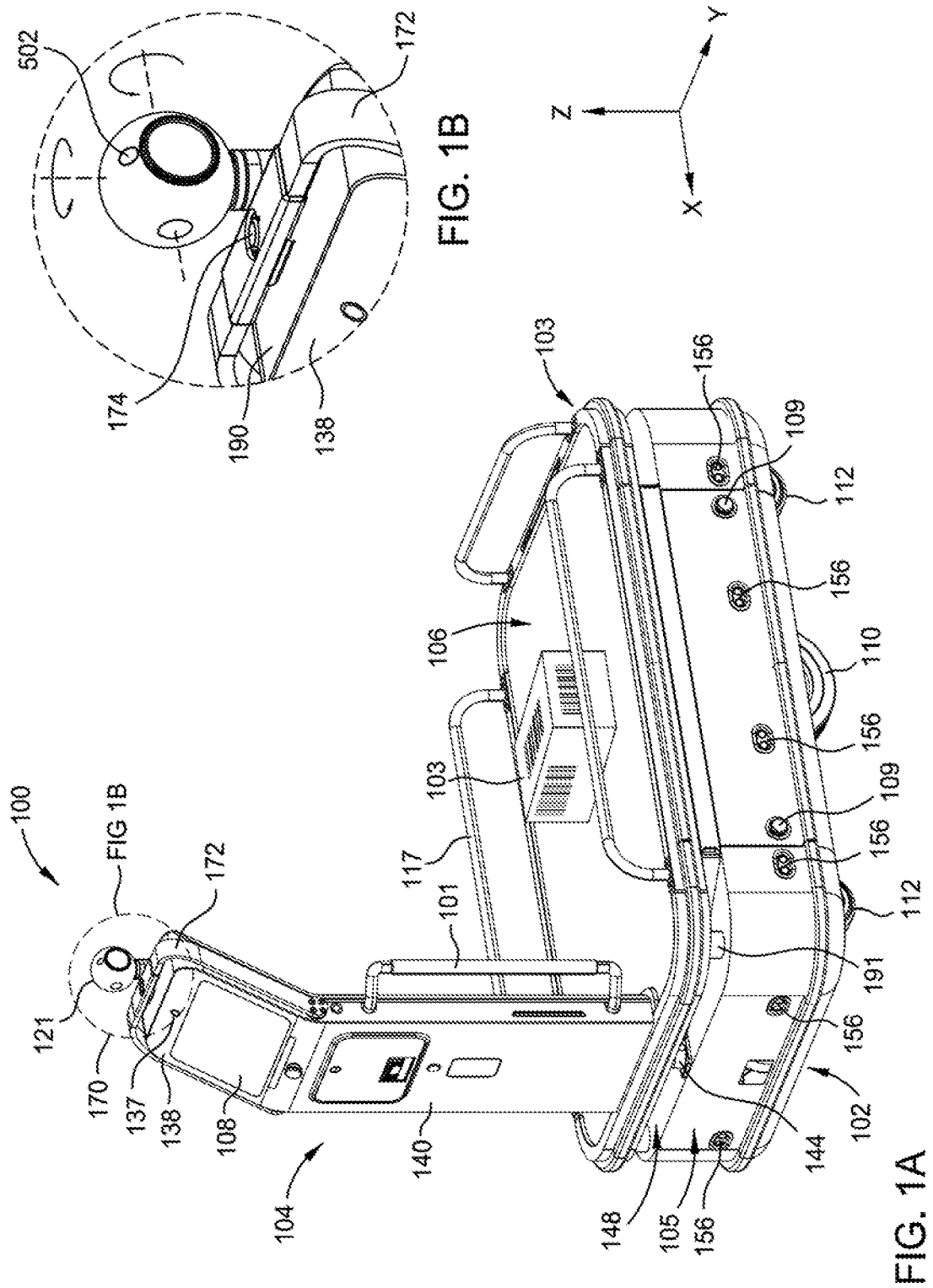
FIG. 1A is a perspective view of an automated guided vehicle (AGV) according to one embodiment.
FIG. 1B is an enlarged view of FIG. 1A showing a portion of the AGV according to one embodiment.

FIG. 1A is a perspective view of an automated guided vehicle (AGV) 100 according to one embodiment. The AGV 100 is adapted to drive itself without an operator. The AGV 100 generally includes a mobile base 102 and a console 104. The mobile base 102 has a rear end 103 and a front end 105 opposing the rear end 103. The console 104 has an upper portion 138 and a main body 140. The main body 140 of the console 104 is coupled to the front end 105 of the mobile base 102 in a standing or upright configuration. One or more rods 101 are optionally provided on either side of the main body 140 to allow an operator to hold and manipulate movement of the AGV 100.

The console 104 has a display 108 configured to display information. The display 108 allows the operator to control the operation of the AGV 100. The display 108 can be any suitable user input device for providing information associated with operation tasks, map of the facility, routing information, inventory information, and inventory storage, etc. If manual use of the AGV is desired, the operator can override the automatic operation of the AGV 100 by entering updated commands via the display 108.

An optional U-shaped handle 172 is coupled to the console 104. In one embodiment, the handle 172 is pivotally attached to the upper portion 138. The handle 172 is moved with respect to the console 104 between a retracted position (as shown) and a pull down position. When the handle 172 is pulled down, the AGV 100 is switched from any operation mode to a manual control mode. FIG. 1B is an enlarged view 171 of FIG. 1A showing a portion of the AGV 100. In the example as shown, the handle 172 is being held in the retracted position and a steerable camera 121 (to be discussed below) is shown to turn sideways. The handle 172 also includes a joystick 174 which allows the operator to control the movement of the AGV 100 when the handle 172 is pulled down and operated under the manual control mode.

The mobile base 102 has one or more motorized wheels 110 and a plurality of stabilizing wheels 112. The motorized wheels 110 are configured to rotate and/or roll in any given direction to move the AGV 100. For example, the motorized wheels 110 can rotate about the Z-axis and roll forward or backward on the ground about its axle spindle along any directions, such as along the X-axis or along the Y-axis. The motorized wheels 110 may be controlled to roll at different speed. The stabilizing wheels 112 may be caster-type wheels. If desired, any or all of the stabilizing wheels 112 may be motorized. In this disclosure, moving forward refers to the situation when the front end 105 is the leading end and moving backward refers to the situation when the rear end 103 is the leading end. In some cases, the AGV 100 has one or more emergency stop button 109 configured to stop a moving AGV when pressed.

The mobile base 102 has an upper surface 106 that can be used to support inventory 103. In some embodiments, the mobile base 102 may include one or more guard rails 117 raised from edges of the upper surface 106 to prevent inventory 103 from sliding off during operation. The AGV 100 is configured to move the inventory 103 autonomously between designated areas within a facility based on pre-stored commands or instructions received from a remote server. The AGV 100 includes one or more cameras for capture images and/or videos of the surroundings of the AGV 100. In some embodiments, the AGV 100 includes an overview camera 137 disposed on the console 104, for example at an area adjacent the display 108. The overview camera 137 is facing away from the rear end 103 of the AGV 100 and is used for object/obstacle detection and avoidance. In some cases, the overview camera 137 can also be configured to identify a shelf and/or an operator so that the AGV 100 can maintain a proper/pre-determined distance with the operator under various operation modes, as will be discussed in this disclosure.

The longitudinal direction of the upper portion 138 of the console 104 is held at an angle with respect to the longitudinal direction of the main body 140. The angle is chosen so that the overview camera 137 can identify the near objects effectively. The angle may be in a range from about 105 degrees to about 165 degrees, such as about 120 degrees to about 150 degrees. Wider or narrower range of angles is contemplated and can be adjusted depending on the application.

The AGV 100 may include one or more proximity sensors to detect the presence of objects nearby and/or measure distances from the objects nearby. For example, one or more sensors 156 may be provided around the mobile base 102 (only two sides are shown). The sensors 156 may be any suitable sonar sensors, ultrasonic sensors, infrared sensors, radar sensors, LiDAR sensors and/or any suitable proximity sensors that can be configured to detect the presence of nearby objects. Each sensor 156 can be configured to sense a field of view greater about 90 degrees.

In some embodiments, one or more sensors 144 may be further provided at the front end 105 and the rear end 103 of mobile base 102, respectively, for obstacle avoidance. For example, the sensors 144 may be provided at the front end 105 and the rear end 103 (only front end is shown). The sensor 144 can be disposed at a cutout 148 below the console 104. The cutout 150 extends across the width of the mobile base 102 and may expand radially outwardly from the sensor 144 to the edge of the mobile base 102. The expansion of the cutout 148 allows the sensors to provide greater sensing area for the AGV 100. Alternatively or additionally, a sensor 191 similar to the sensor 144 may be disposed at one or more corners of the mobile base 102. Likewise, the sensor 144, 191 may be any suitable sonar sensors, ultrasonic sensors, infrared sensors, radar sensors, and/or laser sensors such as LiDAR (light detection and ranging) sensors that can be configured to maintain proper distance and detect the presence of nearby objects that are stationary or moving. Each sensor 144 can be configured to sense a field of view greater about 90 degrees, for example about 270 degrees.

Steerable Camera

In some embodiments, the AGV 100 is equipped with a steerable camera 121. The steerable camera 121 may be provided at the console 104 and/or the mobile base 102. The steerable camera 121 may be removably coupled to the console 104. In one embodiment, the steerable camera 121 is coupled to the top surface 190 (FIG. 1B) of the console 104. In some embodiments, the steerable camera 121 is configured to rotate about 360 degrees about the Z-axis. In some embodiments, the steerable camera 121 is configured to allow two axes of rotation. For example, the steerable camera 121 can be controlled to rotate 360 degrees about the Z-axis (horizontal rotation) and the X-axis or Y-axis that is perpendicular to the Z-axis (vertical rotation). The steerable camera 121 is capable of recording visual images and/or detecting the presence of nearby objects and may include a monocular camera, a binocular camera, and/or a stereo camera. In one embodiment, the steerable camera 121 is configured to detect a human operator, capture the image of the operator, and abstract the characteristics of the operator, such as facial features of the operator, a shape of the operator, bone structures of the operator, a pose/gesture of the operator, the clothing of the operator, or any combination thereof, for purpose of following behind the operator. To follow the operator, the AGV 100 may turn around to move forward, with the front end 105 as the leading end, with the console 104 facing the operator. If the AGV 100 was moving backward previously, for example under the self-navigating mode or the leading mode, the AGV 100 turns to move forward after switching to the following mode.

The combination of the information recorded, detected, and/or measured by the steerable camera 121, the proximity sensors 156, and/or the sensors 144 is used to help autonomously maintain the AGV 100 in a front, rear, or side follow position to an operator. The combination of the information recorded, detected, and/or measured by the steerable camera 121, the proximity sensors 156, and/or the sensors 144 is also used to help autonomously move the AGV 100 in a given direction with the operator while avoiding nearby obstacles.

Figure 2:
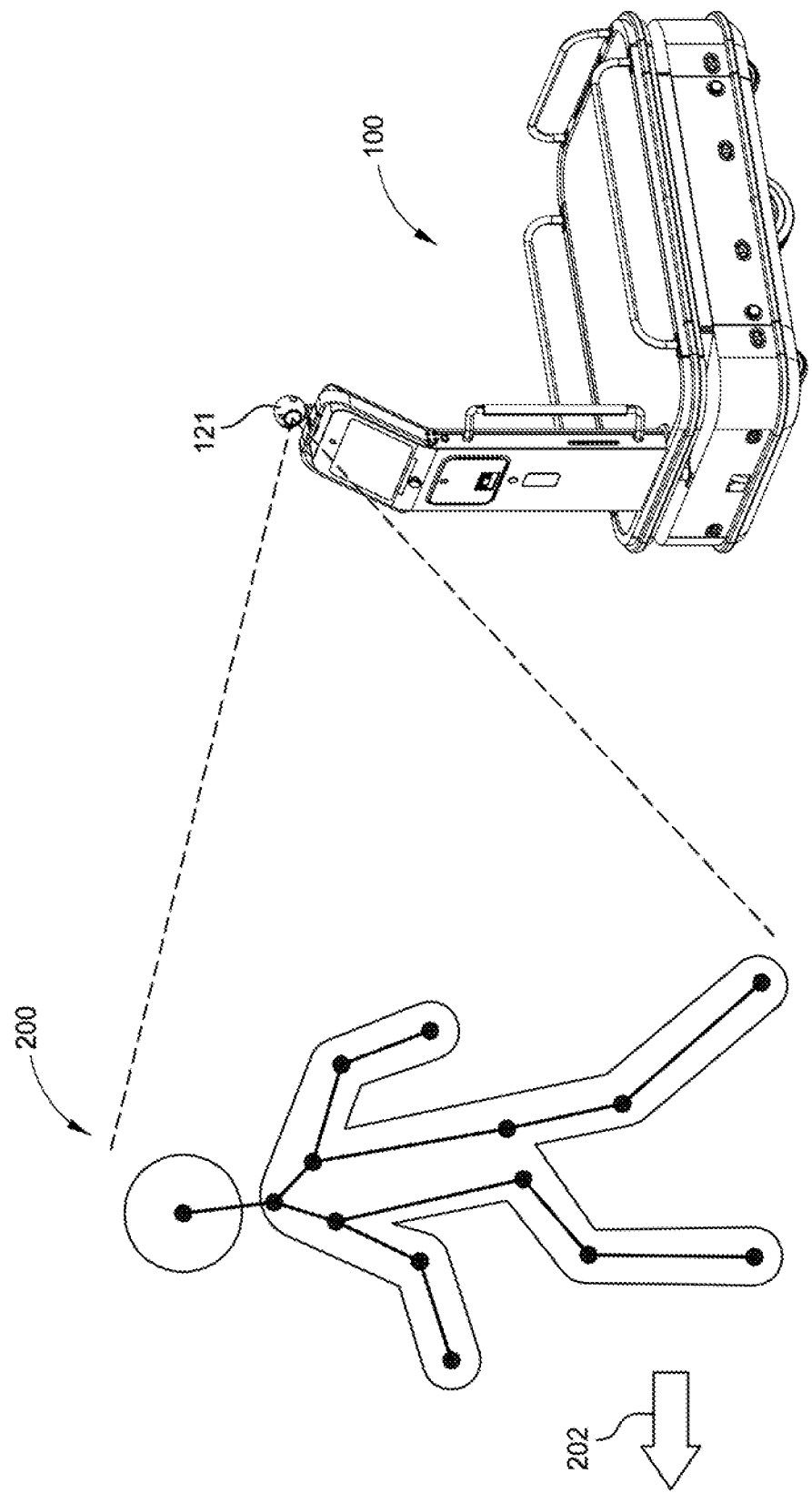
FIG. 2 illustrates one embodiment of an AGV using a steerable camera to identify an operator according to one embodiment.

FIG. 2 illustrates one embodiment where the AGV 100 uses the steerable camera 121 to follow an operator. The steerable camera 121 is configured to recognize facial features, clothing and/or pose of the operator for purpose of following the operator 200 while maintaining a pre-determined distance with the operator in a given direction. Controlling the rotation of the steerable camera 121 in both horizontal and vertical directions allows the AGV 100 to continuously follow any type of object, such as an operator moving in a given direction 202, even if an obstacle is located in the moving path of the AGV 100.

Figure 3C:
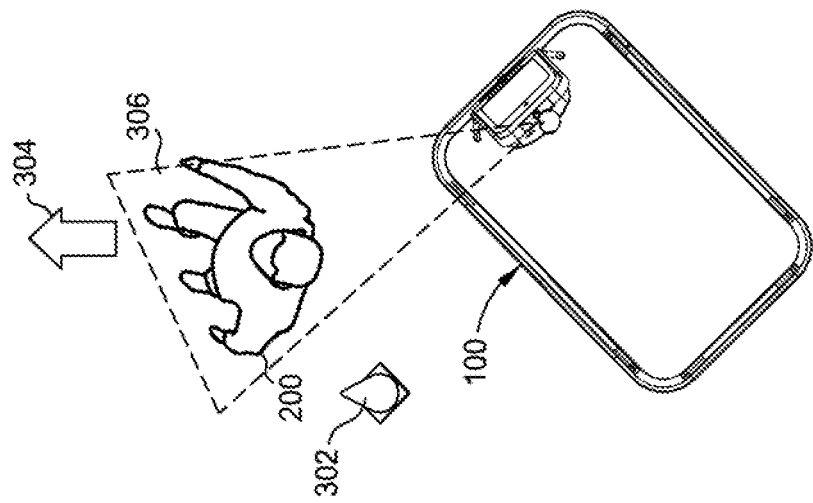
FIGS. 3A-3C illustrate a travel path of an AGV when following an operator in a given direction.
Figure 3B:
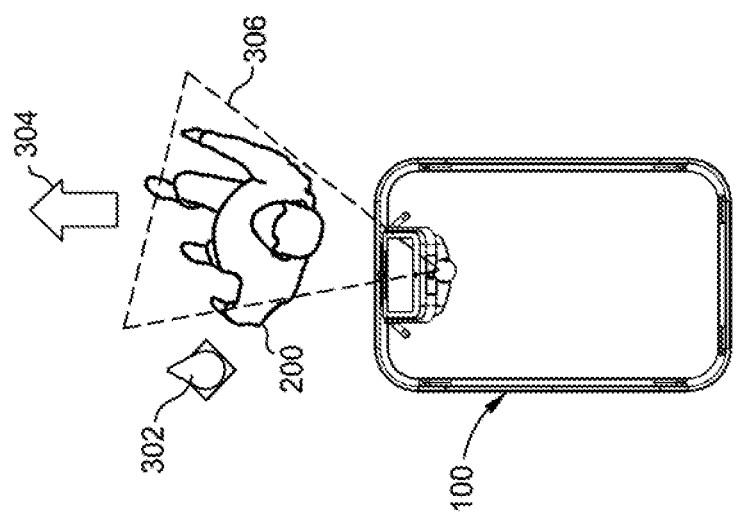
Figure 3A:
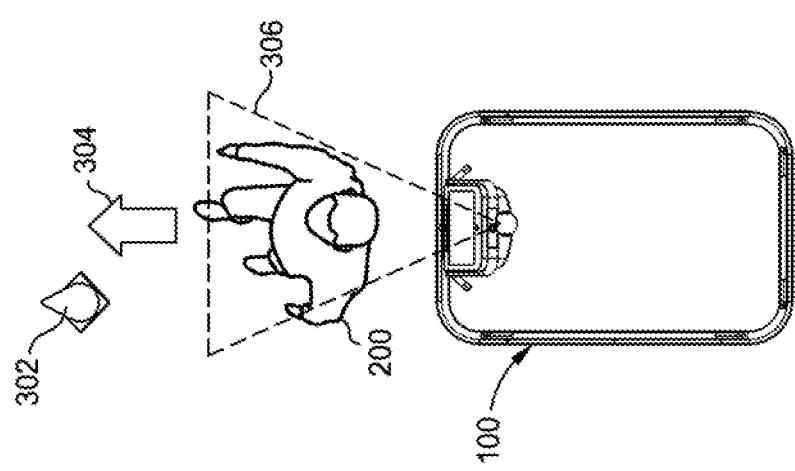

FIGS. 3A-3C illustrate a travel path of the AGV 100 when following behind the operator 200 in a given direction 304 and avoiding an obstacle 302 in front of the AGV 100 according to one embodiment. As shown in FIGS. 3B and 3C, the steerable camera 121 can rotate horizontally to keep the operator 200 within a line of sight of the steerable camera 121, i.e., within the viewing range 306 of the steerable camera 121, while moving in a direction different from the operator 200 to avoid the obstacle 302. The rotation of the steerable camera 121 allows the AGV 100 to continuously follow the operator 200 during various operation modes, such as a following mode to be discussed in this disclosure.

Figure 4:
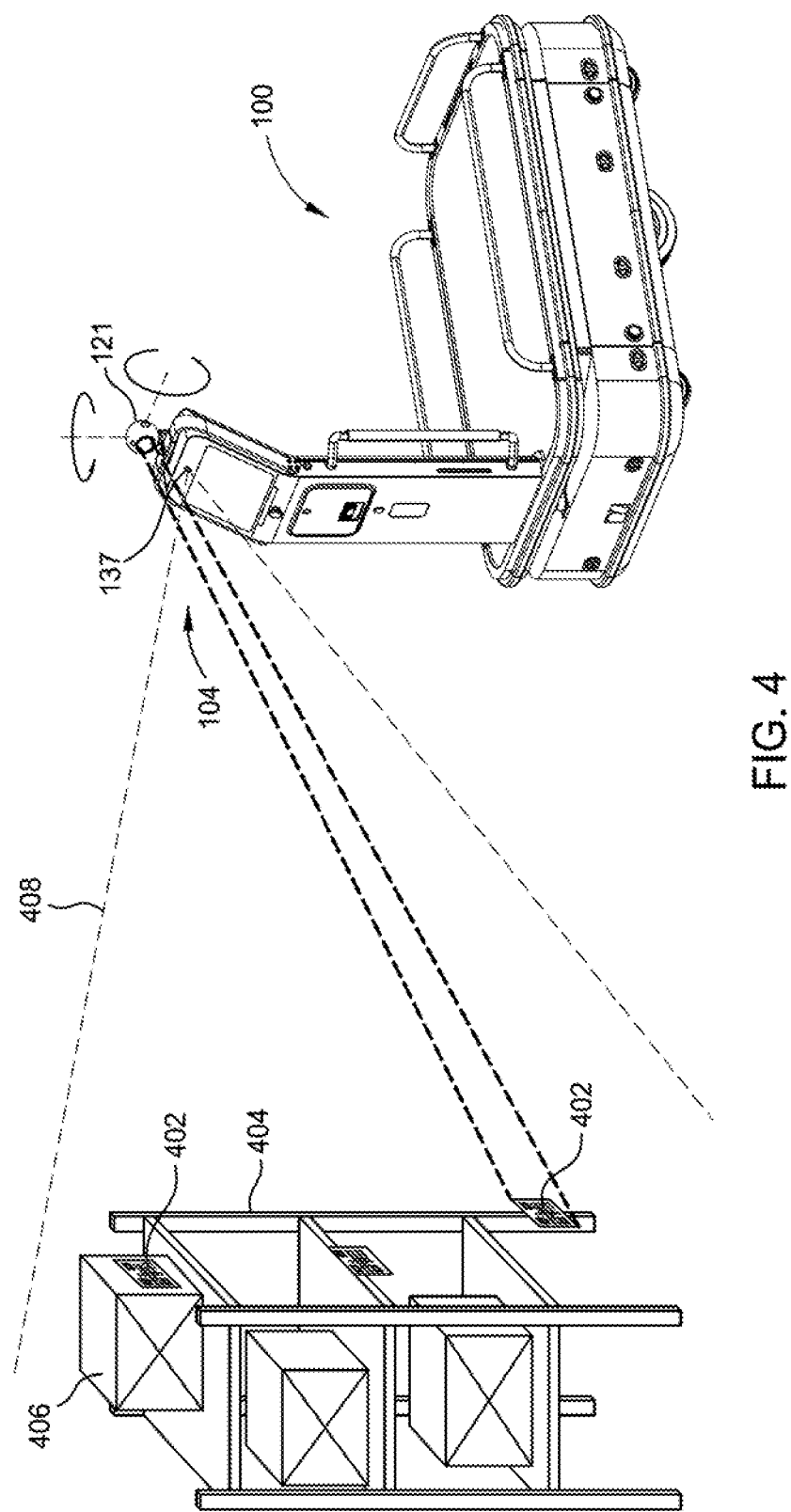
FIG. 4 illustrates one embodiment where a steerable camera is used to identify read markers disposed on a shelf and/or inventory.

In some embodiments, the steerable camera 121 can be, or further include optical zoom to help the AGV 100 optical zoom on specific items. For example, the steerable camera 121 can be configured to identify inventory, determine location of the inventory and/or shelf, read markers, recognize workers etc. FIG. 4 illustrates one embodiment where the steerable camera 121 is used to identify markers 402 attached to the shelf 404 and/or inventory 406. The markers 402 may be reflective markers or any suitable identifiers containing inventory or shelf information, including but not limited to the type of inventory, the quantity of inventory, the location of the shelves, and/or any instructions related to the inventory, such as routing and/or task instructions associated with the inventory, the worker and/or the AGV 100. FIG. 4 further illustrates that the overview camera 137 provides a viewing area 408 to identify the area and shelves within a facility.

Since the markers 402 may sometimes be placed at the top or bottom of the shelves 404, the ability of rotating the steerable camera 121 in both horizontal and vertical directions allows the AGV 100 to optically zoom in/out and get clear image of the markers 402 regardless of where the markers are displaced. The overview camera 137 on the console 104 may further help the AGV 100 to identify the area and shelves within a facility.

In operation, the AGV 100 may be controlled to operate under "self-navigating" mode and travel from a receiving/loading station, where inventories are to be loaded onto the AGV 100, to a restore area, where the inventories are to be unloaded off the AGV 100. The combination of the information recorded, detected, and/or measured by the steerable camera 121, the overview camera 137, and one or more sensors on the AGV 100, as well as the map information of the facility stored in the AGV 100 can be used to help autonomously move the AGV 100 from the receiving/loading station to the restore area. Particularly, the steerable camera 121 can identify and read the markers 402 on the shelves 404 to determine if the shelf 404 for the inventories has been located. Operators may then move the inventories from the AGV 100 to the shelves 404. In some cases, the steerable camera 121 may detect and recognize facial features of an operator and provide on the display 108 job assignment(s) associated with the operator. The identified operator may act according to the job assignment.

Figure 5:
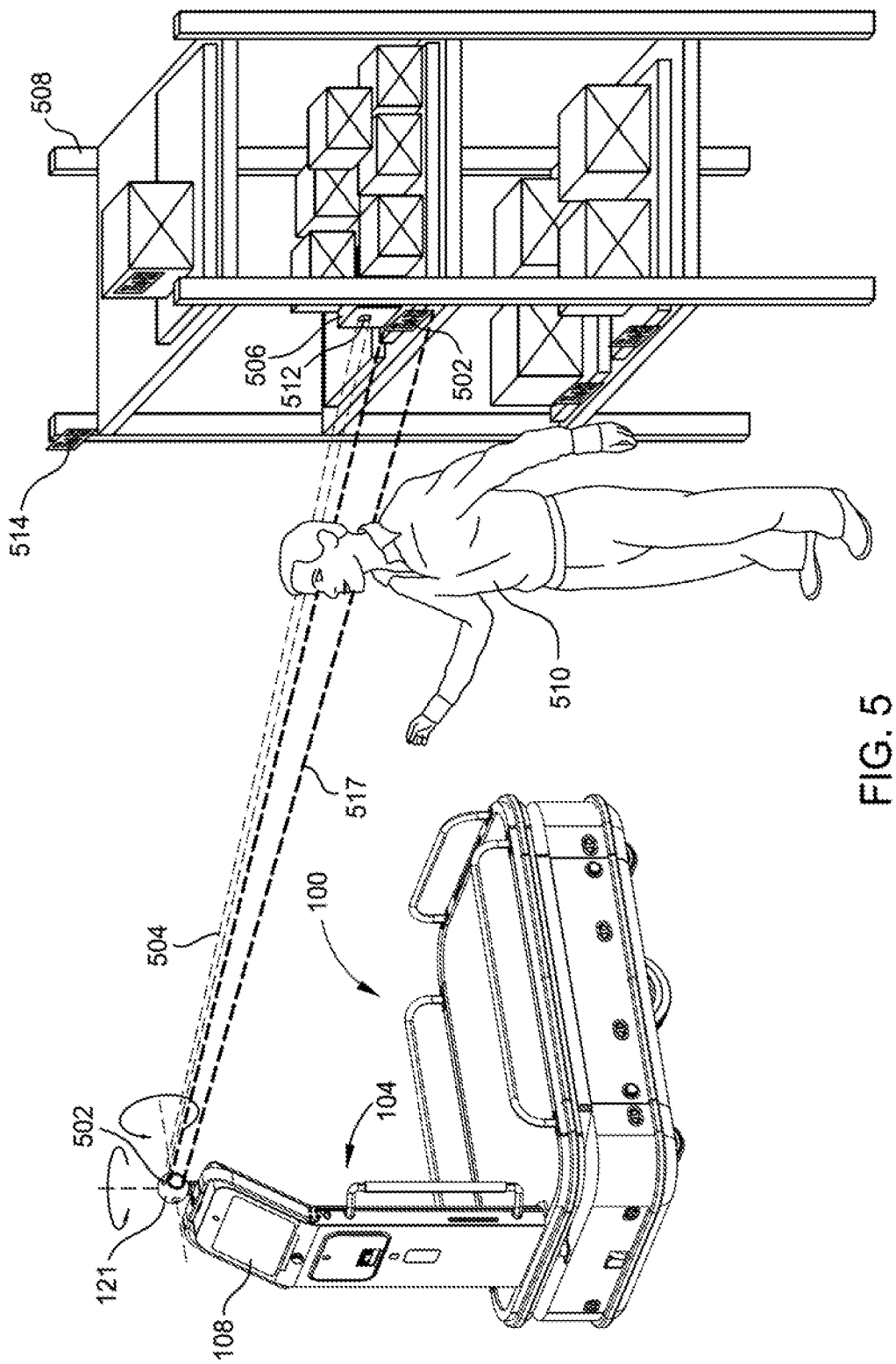
FIG. 5 illustrates an AGV according to another embodiment of the present disclosure.

FIG. 5 illustrates the AGV 100 according to another embodiment of the present disclosure. In this embodiment, which can be combined with any one or more embodiments discussed in this disclosure, the steerable camera 121 is further equipped with a beam pointer 502. The beam pointer 502 has a laser diode configured to produce a laser beam 504. Any suitable beam emitter can also be used. The steerable camera 121 is controlled to point to an inventory 506 to be unloaded off the shelf 508 or picked up by the operator 510. Having the steerable camera 121 rotated in both vertical and horizontal directions enables the AGV 100 to quickly identify the inventory to be picked up by the operator 510 by simply looking at the beam spot 512 on the inventory 506. When there are multiple inventories to be unloaded off the shelf 508, the steerable camera 121 can be controlled to identify them in any suitable sequence based on the task instruction provided to the AGV 100. Such task instruction may include, for example, move X number of inventory A from shelf Y to location Z, move X number of inventory A from shelf Y to shelf W, move X number of inventory A from location B to location C, etc. In any case, the operator can use the beam spot as a guidance to move the inventories without having to check the task instructions on the display 108, thereby minimizing the trip between the console 104, shelves 508 and the AGV 100. This process can be repeated until all the needed inventories have been moved to the AGV 100. With the help of the beam spot 512 to identify the inventories, the loading/unloading process can be done by the operator more efficiently.

In operation, the AGV 100 may be controlled to operate under "self-navigating" mode and travel from a standby/charging area to a restore area where inventories are to be unloaded off the shelves 508 to the AGV 100. When the AGV 100 arrives at the restore area, the AGV 100 may use the steerable camera 121 to search/identify an operator and provide the job assignment associated with the operator on the display 108. In some cases, the operator may select/provide a task instruction (as discussed above) to the AGV 100 using the display 108. Alternatively, the AGV 100 may receive the task instruction from the remote server. For example, the operator may select "waiting for pick-up" mode, which may include instructing the AGV 100 to search for the inventory to be picked up based on the task instructions. The AGV 100 then controls the steerable camera 121 to identify/read the markers 514 on the shelf 508 or the markers 502 on the inventory 506 (e.g., viewing area 517). Once the inventory 506 has been identified, the beam pointer 502 emits a laser beam 504 pointing to the inventory 506 to be picked up by the operator 510. The operator then moves the inventory 506 from the shelf 508 to the AGV 100. If desired, the steerable camera 121 can be controlled to identify and the markers of the inventory that is disposed on the AGV 100 and point the laser beam to the shelf where the identified inventory is belong to. The operator may then move the inventory to the shelf accordingly.

Figure 6:
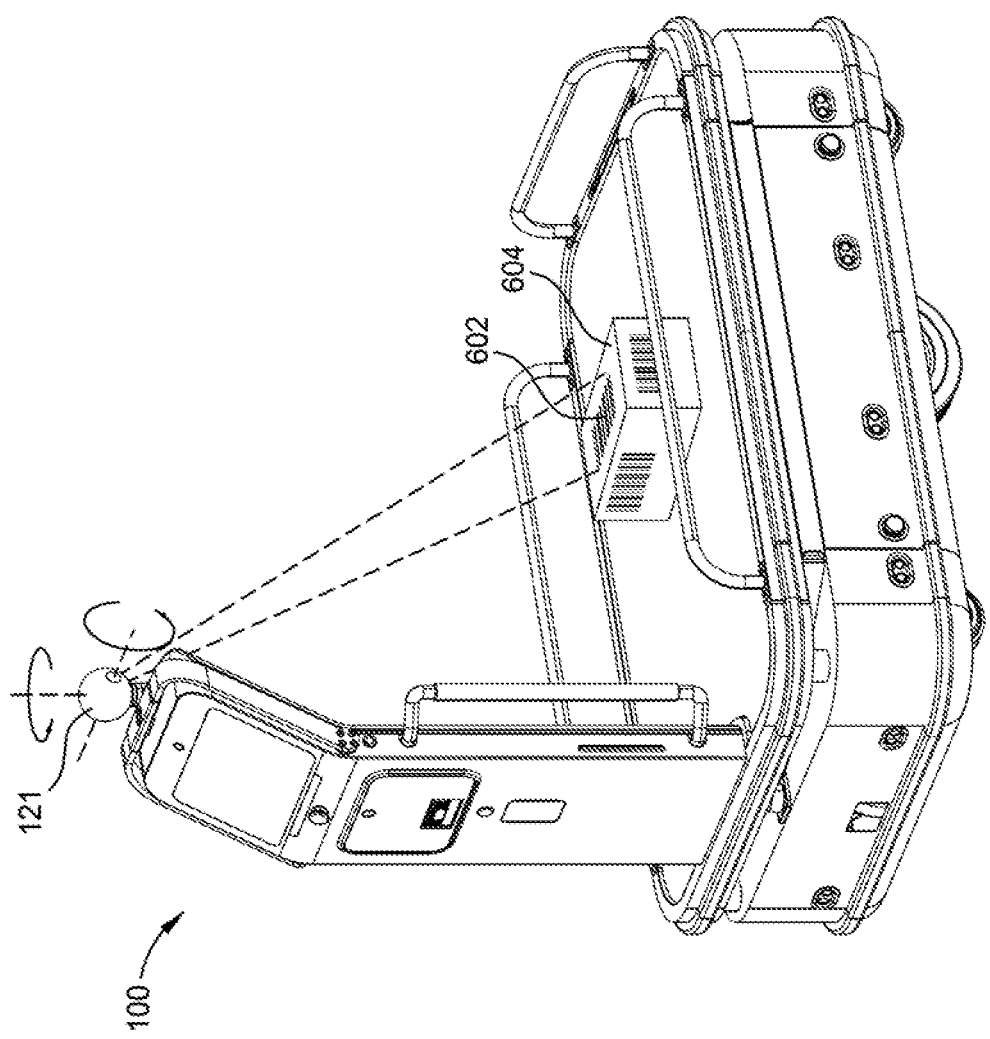
FIG. 6 illustrates one embodiment where a steerable camera is used to scan barcodes attached to inventory placed on an AGV.

In some embodiments, which can be combined with any one or more embodiments of the present disclosure, the steerable camera 121 can be controlled to look down at the loaded inventories and zoom-in to identify and/or scan a barcode (or marker, or any suitable identifier) on the inventory items that have been placed on the AGV 100. The barcode may contain inventory information, including but not limited to the type of inventory, the quantity of inventory, and/or any instructions related to the inventory, such as routing and/or task instructions associated with the inventory and/or the AGV 100. The steerable camera 121 can determine whether all the inventory items have been collected based on the task instructions entered by the operator or received from the remote server. FIG. 6 illustrates one embodiment where the steerable camera 121 is turned 180 degrees and look down for scanning one or more barcodes 602 attached to the inventory 604 that is located on, or to be located on, the upper surface of the mobile base 102.

Figure 7:
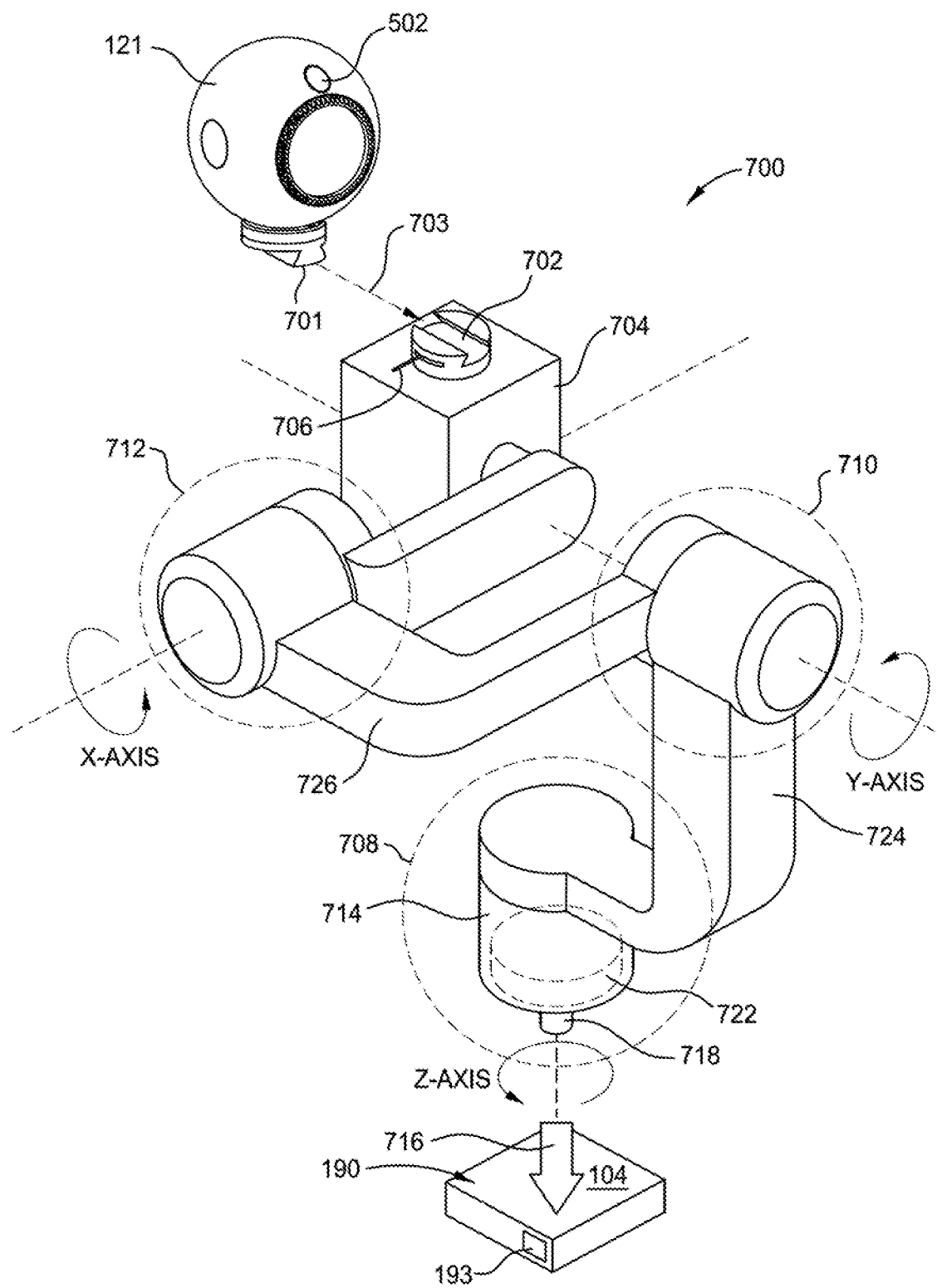
FIG. 7 illustrates a perspective view of a steerable camera to be mounted to a gimbal device according to one embodiment of the present disclosure.

The steerable camera 121 can be removably connected to the AGV 100 via any suitable device. In one embodiment, the steerable camera 121 is coupled to the console 104 using a pivoted support, such as a three-axis gimbal device. In cases where the pivoted support is used, the steerable camera 121 may or may not have two-axes of rotation. The gimbal device allows the steerable camera 121 to operate without camera vibration or shake during the operation. FIG. 7 illustrates a perspective view of the steerable camera 121 to be mounted to an example gimbal device 700 according to one embodiment of the present disclosure. The gimbal device 700 is connected to the top surface 190 of the console 104, which has been simplified as a box for ease of illustration. The bottom 701 of the steerable camera 121 may have a profile configured to slide laterally (represented by a dotted arrow 703) into engagement with a corresponding groove 702 formed in a camera holder 704 of the gimbal device 700. A latch 706 can be provided to the side of the camera holder 704 and operable to lock the steerable camera 121 with the camera holder 704 once they are engaged.

The gimbal device 700 is powered by three motors, e.g., a pan motor 708, a roll motor 710, and a tilt motor 712. The three motors 708, 710, 712 may be a brushless motor for controlling angular motions of the three motors 708, 710, 712 about three axes X, Y, Z, respectively. An inertial measurement unit 193, which may be disposed in the AGV 100, for example the console 104, is configured to respond to movement of the AGV 100, for example, by measuring and monitoring a moment of inertia of the AGV 100 with respect to the overall center of gravity of the AGV 100. The controller of the AGV 100 can use the measured/monitored information and control the three motors 708, 710, 712 to stabilize the steerable camera 121 during various operations discussed in the present disclosure.

In some embodiments, each motors 708, 710, 712 and their associated sensors (e.g., Hall sensor, not shown) are connected to a control and power distribution board (not shown) for the X-axis, Y-axis, and Z-axis. The Hall sensor is configured to indicate the relative positions (e.g., turning position) of stator and rotor of the motors. The pan motor 708 may be rotatably coupled with a shaft 714 mounted on (represented by an arrow 716) the top surface 190 of the upright console 104. A slip ring 722 may be disposed below the pan motor 708. A plurality of electrical wires 718 extending from a lower end of the slip ring 722 are electrically connected with a circuit board (not shown) provided in the console 104, and a plurality of electrical wires (not shown) extending from an upper end of the slip ring 722 are electrically connected with the pan motor 708, the roll motor 710, and the tilt motor 712.

The gimbal device 700 includes a first arm 724 having a first end attached to a side of the pan motor 708 in a manner that the first arm 724 can be freely rotatable 360° relative to the upright console 104 about the Z-axis, which is parallel to the longitudinal axis of the console 104. The roll motor 710 is connected with a second end of the first arm 724. The gimbal device 700 also includes a second arm 726 having a first end attached to a rotatable part of the roll motor 710 in a manner that the second arm 726 can be rotatable 270° relative to the first arm 724 about the Y-axis perpendicular to the X-axis. The tilt motor 712 is connected with a second end of the second arm 726. The camera holder 704, which is used for holding/securing the steerable camera 121, is attached to a rotatable part of the tilt motor 712 in a manner that the camera holder 704 is rotatable relative to the tilt motor 712 about the X-axis orthogonal to the Y and Z axes.

The steerable camera 121 and the gimbal device 700 are controlled by the circuit board, which includes at least a communication module, disposed in the console 104. Task instructions may be sent to the communication module wirelessly over an internet, through a wired connection, or using any suitable manner to communicate with a remote server, such as a system controller 802 to be discussed in FIG. 8. Examples of wireless communication may include, but are not limited to, ultra-wideband, radio frequency identification (active and/or passive), Bluetooth, WiFi, and/or any other form of communication of the communication. Additionally or alternatively, the operator may manually provide task instructions to the AGV 100 through the display 108 so that the steerable camera can perform various tasks, such as those discussed in this disclosure.

Warehouse System

Figure 8:
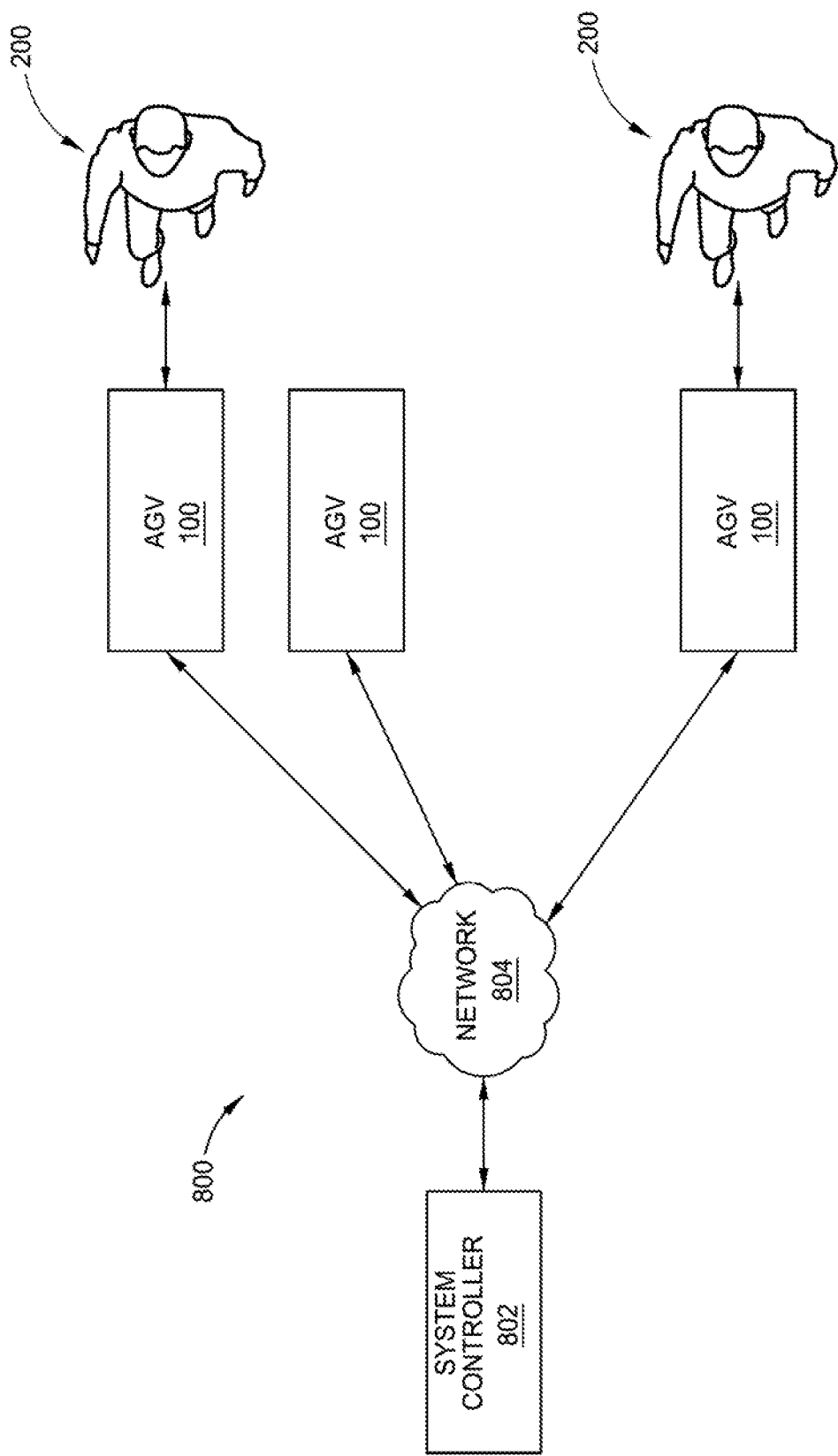
FIG. 8 is a plan view of a warehouse system with a plurality of AGVs according to one embodiment.

The AGVs according to the present disclosure can be used as package carriers in various operating systems, such as warehouses, hospitals, airports, and other environments that may use automated package transportation. FIG. 8 is a plan view of a warehouse system 800 with a plurality of AGVs according to the present disclosure. The warehouse system 800 includes a system controller 802. The system controller 802 communicates with a plurality of AGVs 100 located in the warehouse via a network 804. The plurality of AGVs 100 may interact with operators 200 in the warehouse. The system controller 802 sends instructions and information, such as operator information, inventory information, to the plurality of AGVs 100. The AGVs 100 may send captured images and sensor measurements to the system controller 802. The AGVs 100 and the operators 200 interact directly or with the system controller 802 involved to perform various operations, such as leading operators to a job site, following operators to a job site, signaling operators needs for loading/unloading, reacting to gestures form operators, and avoiding collisions with other AGVs.

Figure 9:
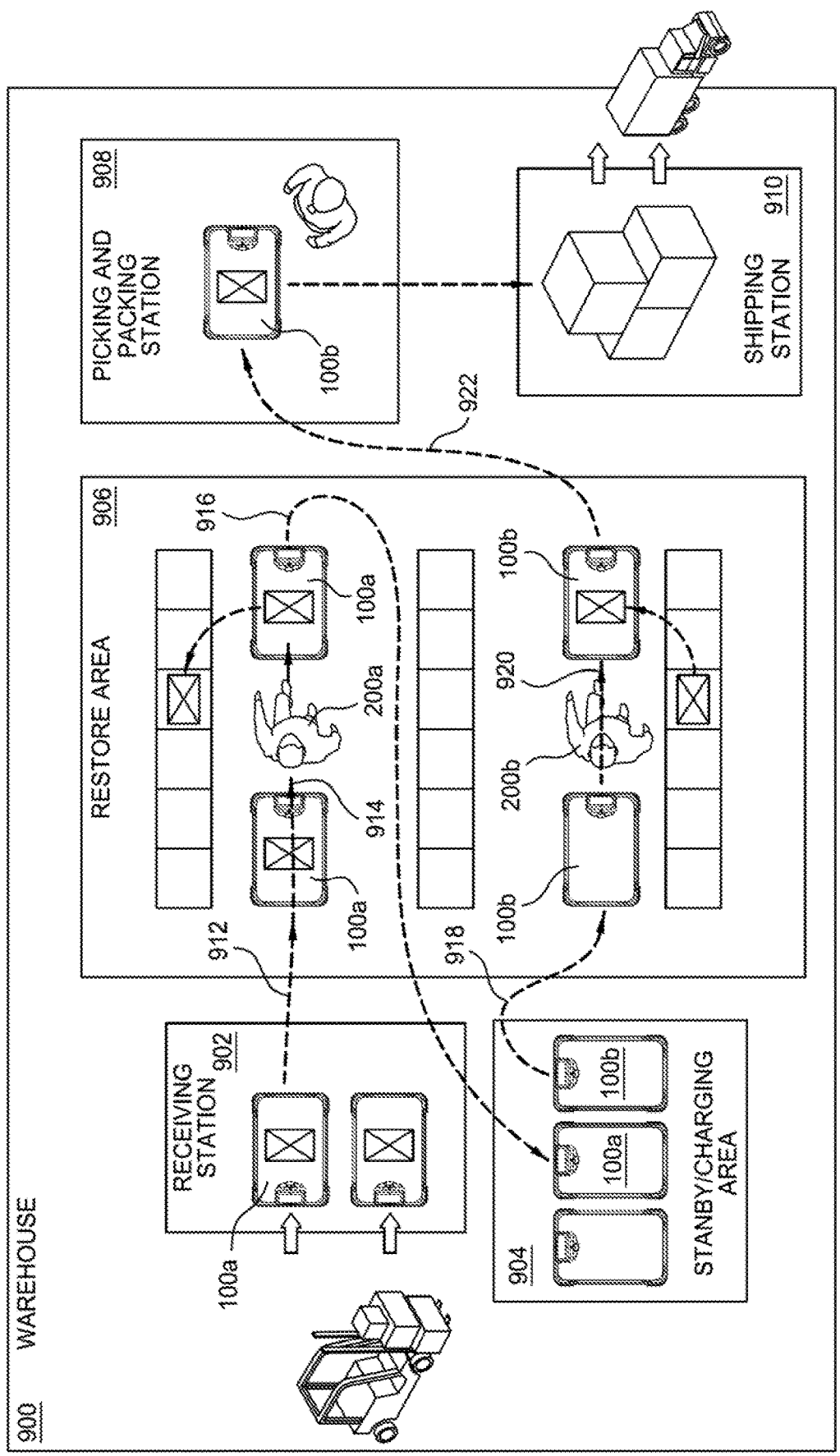
FIG. 9 is a schematic view of a warehouse using AGVs for transporting packages/inventories according to one embodiment.

FIG. 9 is a schematic view of a warehouse 900 using AGVs for transporting packages/inventories. The warehouse 900 may include a receiving area 902, a standby/charging area 904, a restore area 906, a picking/packing area 908, and a shipping area 910. A plurality of AGVs and one or more operators can transport and process packages in the warehouse 900. FIG. 9 schematically demonstrates two exemplary tasks performed by AGV 100a and AGV 100b, which can have features identical to the AGV 100 discussed in this disclosure. It is contemplated that the AGV 100a, 100b have features identical to the AGV 100 discussed above.

In one example, the AGV 100a is first loaded with packages at the receiving area 902. Upon the package loading is complete, the AGV 100a may receive instructions from a remote server, such as the system controller 802 in FIG. 8, to transport the packages to the restore area 906. In some embodiments, the AGV 100a transports the packages from the receiving station 902 to the restore area 906 through route 912 under the self-navigating mode. The route 912 may be chosen by the system controller or selected by the AGV 100a based on the map information in the storage device of the AGV 100a. In the self-navigating mode, the AGV 100a may move backwards, i.e., with the rear end 103 as the leading end.

When arriving at the restore area 906, the AGV 100a interacts with a operator 200a. In some embodiments, the AGV 100a may stop upon arrival of the restore area 906 while the signal lights to indicate that the AGV 100a is waiting for unloading. The operator 200a may come to the waiting AGV 100a to interact with the AGV 100a through the display 108. In some embodiments, the operator 200a may set the AGV 100a to the "following mode" through the touch screen on the display. The AGV 100a uses the steerable camera 121 to capture the image of the operator 200a and abstract the characteristics of the operator 200a, such as facial features, clothing and/or pose of the operator, for purpose of following the operator 200a. To follow the operator 200a, the AGV 100a may turn around to move forward, with the front end 105 as the leading end, with the console 104 facing the operator 200a.

The AGV 100a follows the operator 200a along the route 914, which may be unknown to the AGV 100a, to a location where the operator 200a unloads the packages. In some embodiments, the AGV 100a and the operator 200a may make two or more stops to unload all the packages. After unloading the packages, the operator 200a may set the AGV 100a to "self-navigating" mode. The AGV 100a turns around to move backwards to the standby/charging area 904 along a route 916. The route 916 may be chosen by a system controller or selected by the AGV 100a based on the map information in the storage device. The AGV 100a gets charged up at the standby/charging area 904 and waits for further instructions from the system controller.

Alternatively, the AGV 100a may be performed under the leading mode. For example, upon interacting with the operator 200a, the AGV 100a captures the image of the operator 200a and sends the image to the system controller, such as the system controller 802 in FIG. 8. The system controller identifies the operator 200a based on the image according to information stored in the system, and sends a task instruction to the AGV 100a based on the role of the operator 200a and the packages on the AGV 100a. The AGV 100a receives and displays the task information on the display 108. After seeing the task information on the display 108, the operator 200a may decide whether to follow or to lead the AGV 100a. If the operator 200a decides to follow the AGV 100a, the operator 200a sets the AGV 100a to the leading mode. The AGV 100a selects the route 914 according to the task instruction and the stored map information, and leads the operator 200a to the location for package unloading.

In another example, upon receiving an instruction to go to the restore area 906, the AGV 100b waiting at the standby/charging station 904 travels from the standby/charging area 904 to the restore area 906 through route 918 under the self-navigating mode. In the self-navigating mode, the AGV 100a may move backwards, i.e. with the rear end 103 as the leading end.

When arriving at the restore area 906, the AGV 100b interacts with an operator 200b. In some embodiments, the AGV 100b may stop upon arrival of the restore area 906 while the signal lights to indicate that the AGV 100b is waiting for loading. The operator 200b may come to the waiting AGV 100b to interact with the AGV 100b through the display 108. For example, the operator 200b may check the display 108 to find out the task instructions, which may include but are not limited to, move X number of inventory A from shelf Y to location Z, move X number of inventory B from shelf Y to location Z, move X number of inventory C from shelf W to location C, etc. In some cases, the operator 200b may select "waiting for pick-up" mode on the display, which may include instructing the AGV 100b to search for inventory to be picked up. In such a case, the AGV 100b uses the steerable camera 121 to identify the inventory to be picked up by the operator 200b. The steerable camera 121 emits a beam from the beam pointer 502 of the steerable camera 121 at the identified inventory, in a manner as discussed above with respect to FIG. 5. In this way, the operator 200b can move inventory from a shelf to the AGV 100b efficiently without having to check the task instructions on the display 108 for every items, thereby reducing the trip back and forth between the console 104, shelves 508 and the AGV 100.

If desired, the operator 200b may set the AGV 100b to the "following mode" through the touch screen on the display 108. The AGV 100b uses the steerable camera 121 to capture the image of the operator 200b for purpose of following the operator 200b as discussed above. To follow the operator 200b, the AGV 100b may turn around to move forward, with the front end 105 as the leading end, with the console 104 facing the operator 200b. The AGV 100b follows the operator 200b along the route 920, which may be unknown to the AGV 100b, to a location where the operator 200b loads packages on to the AGV 100b.

Alternatively, the AGV 100b may be performed under the leading mode. For example, upon interacting with the operator 200b, the AGV 100b captures the image of the operator 200b and sends the image to the remote server, such as the system controller 802 in FIG. 8. The system controller identifies the operator 200b based on the image according to information stored in the system, and sends a task instruction to the AGV 100b based on the role of the operator 200b. The AGV 100b receives and displays the task information on the display 108. After seeing the task information on the display 108, the operator 200b may decide whether to follow or to lead the AGV 100b. If the operator 200b decides to follow the AGV 100b, the operator 200b sets the AGV 100b to the leading mode. The AGV 100b selects the route 920 according to the task instruction and the stored map information, and leads the operator 200b to the location for package loading.

After loading the packages, the operator 200b may set the AGV 100b to self-navigating mode. The AGV 100b turns around to move backwards to the picking and packing station 908 along a route 922. The route 920 may be selected by the AGV 100b based on the map information in the storage device. The AGV 100b gets unloaded at the picking and packing station 908, where the packages are processed and sent to the shipping station 910 to leave the warehouse 900.

Figure 10:
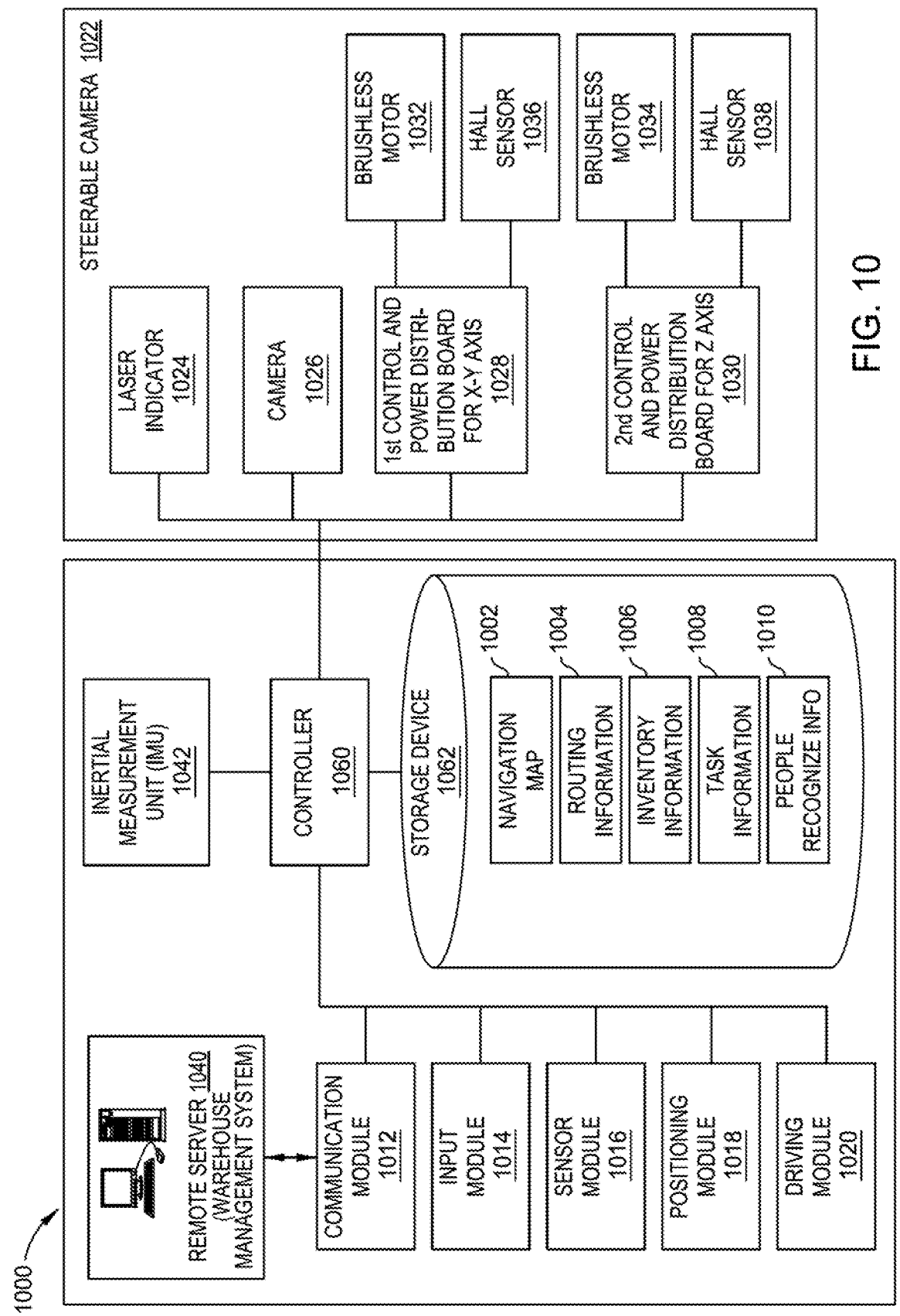
FIG. 10 is a block diagram of the AGV according to one embodiment.

FIG. 10 is a block diagram of the AGV 100 according to one embodiment. The AGV 100 includes a controller 1060 configured to control various operations of the AGV 100, which include any combination of the embodiments discussed in this disclosure or any type of task as needed using the AGV 100. The controller 1060 is a programmable central processing unit (CPU) or any suitable processor that is operable with a memory. The controller 1060 is in communication with a storage device 1062 containing data for performing operations, such as map information 1002, routing information 1004, inventory information 1006, task information 1008, people recognition information 1010, and the likes. The controller 1060 is also in communication with several modules configured to control the operations of the AGV 100. In some embodiments, the modules include a communication module 1012, an input module 1014, a sensor module 1016, a positioning module 1018, and a driving module 1020. The communication module 1021 is configured to transmit or receive information/instruction from a remote server 1040, such as a system controller, which may be a warehouse management system. The input module 1014 is configured to provide or receive information to a display (e.g., display 108) of the AGV 100. The sensor module 1016 is configured to control and receive information from the sensors (e.g., sensors 144, 156) of the AGV 100. The positioning module 1018 is configured to communicate information regarding the position of the AGV 100 to the controller 1060. The positioning module 1018 may include GPS, WiFi access points, and/or Bluetooth beacons so that the remote server 1040 and/or a human operator can find the location of the AGV 100 at any time. The driving module 1020 is configured to control movement of the motorized wheels of the AGV 100.

The controller 1060 is in communication with an inertial measurement unit 1042 to measure and determine orientation and motion of the AGV 100. The controller 1060 is also in communication with a steerable camera 1022 (e.g., steerable camera 121) configured for track-tracking, identifying markers on an inventory or a shelf, identifying markers on an inventory that is on the shelf or the AGV, emitting a beam onto inventory to be loaded or unloaded from the shelf as discussed previously. In some embodiments, the steerable camera 1022 is in communication with a laser indicator 1024, a camera 1026, a first control and power distribution board 1028 for X-Y axis, and a second control and power distribution board 1030 for Z-axis. The first and second control and power distribution boards 1028, 1030 are each in communication with their respective brushless motor 1032, 1034 and Hall sensor 1036, 1038 to control the operation of the steerable camera 1022.

The controller 1060, the modules 1012-1018, and/or the data contained on the storage device 1062 are configured to control the movement of the AGV 100, the steerable camera 1022, and/or the information displayed on the display of the AGV 100, all based at least in part on the information received from the proximity sensors (e.g., sensors 144, 156), the cameras (e.g., cameras 121, 137), inertial measurement unit 1042, user input from the user interface components, and from the remote server. The remote server 1040 is also in communication with the communication module 1012 of the AGV 100. The controller 1060 is configured to analyze the information received or retrieved from the cameras, the proximity sensors, the data on the storage device 1062, and/or any of the modules and in response to control the operation of the AGV 100, including the motorized wheels (e.g., motorized wheels 110, 112), and/or the information displayed on the display of the AGV 100 (e.g., display 108).

In one embodiment, the controller 1060 is configured to receive information from the sensor module 1016, the proximity sensor (e.g., sensors 144, 156) and the images captured by the steerable camera 1022 (e.g., steerable camera 121) regarding the presence and characteristics of an operator, and may optionally communicate with the remote server 1040 to determine if the correct operator has been identified. Once the operator has been identified, the controller 1060 is configured to control the movement of the steerable camera 1022, such as by rotating the steerable camera 1022 horizontally and/or vertically to follow the operator constantly, based in part on the information provided to the first and second control and power distribution boards 1028, 1030.

Information regarding the operator can be stored on the storage device 1062 and accessed by the controller 1060 and/or an operator for future reference as needed. At any time, the controller 1060 can retrieve data from the information stored on the storage device 1062, including the map information 1002, the routing information 1004, the inventory information 1006, and/or the task information 1008, and/or the people recognition information 1010 to help determine the operator and/or suitable operator for performing the task.

In one embodiment, the controller 1060 is configured to receive information from the sensor module 1016, the proximity sensor (e.g., sensors 144, 156) and the images captured by the steerable camera 1022 (e.g., steerable camera 121) regarding the presence or absence of a shelf and information about the shelf, and may optionally communicate with the remote server 1040 to determine if the correct shelf has been identified. Once the shelf has been identified, the controller 1060 is configured to control the movement of the steerable camera 1022 to search/identify the inventory to be loaded or unloaded from the shelf, based in part on the inventory information 1006 and/or task information 1008. The controller 1060 controls the laser indicator 1024 to point the laser beam to the inventory to be loaded or unloaded from the shelf in any suitable sequence until all of the identified inventories have been loaded or unloaded from the shelf by the operator. The controller 1060 may also be configured to compare the inventory information with a list and quantity of inventory preselected by the operator to determine that the correct inventory has been received or detected by the AGV 100.

Information regarding the location of the shelf can also be stored on the storage device 1062 and accessed by the controller 1060 and/or an operator for future reference as needed. At any time, the controller 1060 can retrieve data from the information stored on the storage device 1062, including the map information 1002, the routing information 1004, the inventory information 1006, and/or the task information 1008 to help determine the location of the shelf.

In one embodiment, the controller 1060 is configured to receive information from the steerable camera 1022 regarding an object (e.g., inventory) placed on the AGV 100, and may optionally communicate with the remote server 1040 to determine if the object placed on the AGV 100 is correct. The controller 1060 is configured to control the movement of the steerable camera 1022, such as by rotating the steerable camera 1022 horizontally and/or vertically to search and scan one or more markers (such as barcodes) attached to the object. Once the AGV 100 determines correct object (or all needed objects) has been placed on the AGV 100, the controller 1060 may control the AGV 100 to travel to the next destination (e.g., restore area or shipping station).

Information regarding the inventory can be stored on the storage device 1062 with the inventory information 1006 and accessed by the controller 1060 and/or an operator for future reference as needed. At any time, the controller 1060 can retrieve data from the information stored on the storage device 1062, including the map information 1002, the routing information 1004, the task information 1008 and/or the inventory information 1006 to help identify the marker and the inventory information associate with the marker. The AGV 100 may continue operation and the process above may be repeated for any number of markers attached to any object (such as inventory or a storage rack storing inventory).

While the foregoing is directed to embodiments of the disclosure, other and further embodiments of the disclosure thus may be devised without departing from the basic scope thereof, and the scope thereof is determined by the claims that follow.

The invention claimed is:

1. A self-driving system, comprising:
 a body having one or more motorized wheels, the body having a first end and a second end opposing the first end;
 a console coupled in an upright position to the first end of the body;
 a camera coupled to the console, the camera providing two axes of rotation and is operable to follow an object; and
 a beam pointer disposed on the camera and is operable to produce a laser beam having a beam spot that is visible to an operator,
 wherein the console further comprising:
  a controller operable to:
   direct movement of the camera to locate a first object disposed at a first location and operable to direct the beam spot on the first object as a guidance to assist the operator in locating the first object;

after the first object is moved from the first location to a second location different than the first location, direct movement of the camera to locate a second object disposed at a third location different than the first and second locations and direct the beam spot on the second object as a guidance to assist the operator in locating the second object.

2. A self-driving system, comprising:

a mobile base having one or more motorized wheels;

a console coupled in an upright position to the mobile base;

a camera removably coupled to the console via a three-axis pivoted support, wherein the camera is rotatable in vertical and horizontal directions;

a beam pointer disposed on the camera, the beam pointer being operable to produce a laser beam; and a controller disposed within the console, the controller being operable to direct movement of the camera and direction of the laser beam to form a visible beam spot on a first identified item as a guidance for target tracking, and after the first identified item is moved from a first location to a second location, direct movement of the camera and direction of the laser beam to move the visible beam spot on a second identified item as a guidance for target tracking.

3. The system of claim 2, wherein the three-axis pivoted support further comprising:

a pan motor, a roll motor, and a tilt motor;

a first arm having a first end attached to a side of the pan motor and a second end connected with the roll motor, wherein the first arm is freely rotatable relative to the console;

a second arm having a first end attached to a rotatable part of the roll motor and a second end connected with the tilt motor, wherein the second arm is rotatable relative to the first arm; and a camera holder for holding the first camera, wherein the camera holder is attached to a rotatable part of the tilt motor.

4. The system of claim 2, wherein the controller is operable to point the laser beam to the identified item based on an instruction from a remote server or an operator.

5. The system of claim 2, wherein the controller is operable to direct the camera to identify a marker attached to an object that has been placed or to be placed on an upper surface of the mobile base.

6. The system of claim 2, wherein the controller is operable to direct the camera to identify a marker attached to a shelf.

7. A method of operating a self-driving system, comprising:

moving the self-driving system to a pre-determined area having a shelf;

directing a camera to identify a first object to be removed from the shelf based on a task instruction;

emitting a beam from a laser indicator disposed on the camera to form a first beam spot on the identified first object as a guidance;

after the first object is removed from the shelf, directing the camera to identify a second object to be removed from the shelf based on the task instruction; and emitting the beam from the laser indicator to form a second beam spot on the second object until the second object is removed from the shelf.

8. The method of claim 7, wherein moving the self-driving system to a pre-determined area further comprising:

identifying a marker attached to the shelf by directing two-axis rotation of the camera.

9. The method of claim 7, wherein the self-driving system continuously moves behind an operator within a line of sight of the camera under a following mode.

10. The method of claim 9, wherein the following mode further comprising:

detecting and abstracting characteristics of the operator by recognizing facial features of the operator, a shape of the operator, bone structures of the operator, a pose/gesture of the operator, a clothing of the operator, or any combination thereof.

11. The method of claim 7, further comprising:

directing two-axis rotation of the camera to scan a barcode, a marker, or an identifier of one or more objects disposed on the self-driving system.

* * * * *